United States Patent [19]

Franken et al.

[11] Patent Number: 4,647,166
[45] Date of Patent: Mar. 3, 1987

[54] SCREEN EXTENSION LINKAGE FOR A VIDEO REAL-SCREEN PROJECTION APPARATUS

[75] Inventors: Adrianus J. J. Franken; Waltherus A. M. van Bers; René M. van Bree; Adrianus C. van Kasteren, all of Eindhoven, Netherlands

[73] Assignee: U.S. Philips Corporation, New York, N.Y.

[21] Appl. No.: 821,504

[22] Filed: Jan. 21, 1986

Related U.S. Application Data

[63] Continuation of Ser. No. 731,332, May 6, 1985, abandoned, which is a continuation of Ser. No. 623,599, Jun. 22, 1984, abandoned.

[30] Foreign Application Priority Data

Jun. 28, 1983 [NL] Netherlands .......................... 8302277

[51] Int. Cl.[4] .......................... G03B 21/24; H04N 9/31
[52] U.S. Cl. ..................................... 353/79; 358/237; 358/254
[58] Field of Search ................................... 353/74–79, 353/119; 358/237, 250, 254

[56] References Cited

U.S. PATENT DOCUMENTS

| 2,150,992 | 3/1939 | Scott | 353/73 |
| 2,476,494 | 7/1949 | Jones et al. | 353/788 |
| 3,943,282 | 3/1976 | Muntz . | |
| 3,944,734 | 3/1976 | Ogawa . | |
| 4,394,681 | 7/1983 | Rowe | 358/237 X |
| 4,479,144 | 10/1984 | Yamazaki . | |

FOREIGN PATENT DOCUMENTS 680918 10/1952 United Kingdom .
747415 4/1956 United Kingdom .

OTHER PUBLICATIONS

IBM Tech. Disc. Bull., "Compact Expandible Viewer", R. E. Cox, vol. 13, #12, 5/71.

Primary Examiner—Harry N. Haroian
Attorney, Agent, or Firm—David R. Treacy

[57] ABSTRACT

A video rear-screen projection apparatus includes a housing accommodating a fixedly arranged cathode-ray tube unit which is provided with a projection lens and which is secured to a frame. The apparatus also includes a first mirror pivotally connected to the housing so that the mirror can be located entirely inside the housing or can be extended with its reflecting surface facing the projection lens. The apparatus further includes a transparent screen which extends in the direction of width of the housing and is pivotally associated with a pivot on the frame, and also includes a second mirror pivotally associated with the housing. The screen and the two mirrors are arranged such that they can be extended so that the light rays from the cathode-ray tube strike the transparent screen or can be folded so that they are located inside the housing.

14 Claims, 2 Drawing Figures

SCREEN EXTENSION LINKAGE FOR A VIDEO REAL-SCREEN PROJECTION APPARATUS

This is a continuation of application Ser. No. 731,332, filed May 6, 1985, now abandoned, which is a continuation of application Ser. No. 623,599, filed June 22, 1984, now abandoned.

BACKGROUND OF THE INVENTION

The invention relates to a video rear-screen projection apparatus in which pictures are projected from a cathode-ray tube through one or more mirrors onto an enlarged picture screen. The various components of known apparatus are in part accommodated movably in a housing in such a manner that, when the apparatus is out of use, all the components are located inside the housing, while, when the apparatus is in use, one or more of the components are moved outwards in order to obtain a system which optically operates correctly.

SUMMARY OF THE INVENTION

The invention has for its object to provide a video rear-screen projection apparatus of the above kind comprising a movement mechanism for the various components wich mechanism is of simple construction and which mechanism, in a folded condition, yields an apparatus of very small dimensions.

In order to achieve this object, the apparatus according to the invention comprises a housing accommodating a fixedly arranged cathode-ray tube which has a projection lens arranged with the optical axis in a plane of symmetry, the components of the movement mechanism being preferably arranged symmetrically about the plane. The tube and lens are secured to a frame which, adjacent two opposite side walls of the housing, has two members in which a shaft coupled to a motor is journalled at its ends, which shaft carries a plate or crank member at each of its ends. The inventive apparatus further comprises a first mirror which extends in the direction of width of the housing and is connected at two opposite sides via hinges which define a first pivot axis perpendicular to the plane of symmetry, arranged approximately in alignment with its wide side to said side walls of the housing, the first mirror being pivotally linked by a bar on each of said two sides to an associated one of said plates so that, in one position of the plates, the mirror is located entirely inside the housing and in another position it is extended with its reflecting surface facing the projection lens. The inventive apparatus further comprises a transparent screen which extends in the direction of width of the housing and parallel to the front side of the housing and is provided at each of two opposite sides with a pair of pivots which are located a certain distance above one another and which are connected by first and second links or bars which cross one another to a pivot on the frame, and a pivot on an associated one of said plates, respectively, each of the first bars being provided between its ends with a pivot which is connected via a third link or bar to the associated one of said plates, and a second mirror being supported between the second bars in such a manner that, upon rotation of said plates, the screen and the two mirrors are extended so that the rays from the cathode-ray tube strike the transparent screen and, in the folded condition, said components are all located inside the housing.

The invention will be described more fully with reference to the drawing which shows in sectional view an embodiment of a video projection apparatus in two conditions.

BRIEF DESCRIPTION OF THE DRAWING

FIG. 1 is a side elevational view of the apparatus in the extended condition, while

DESCRIPTION OF THE PREFERRED EMBODIMENTS

Figure 1:
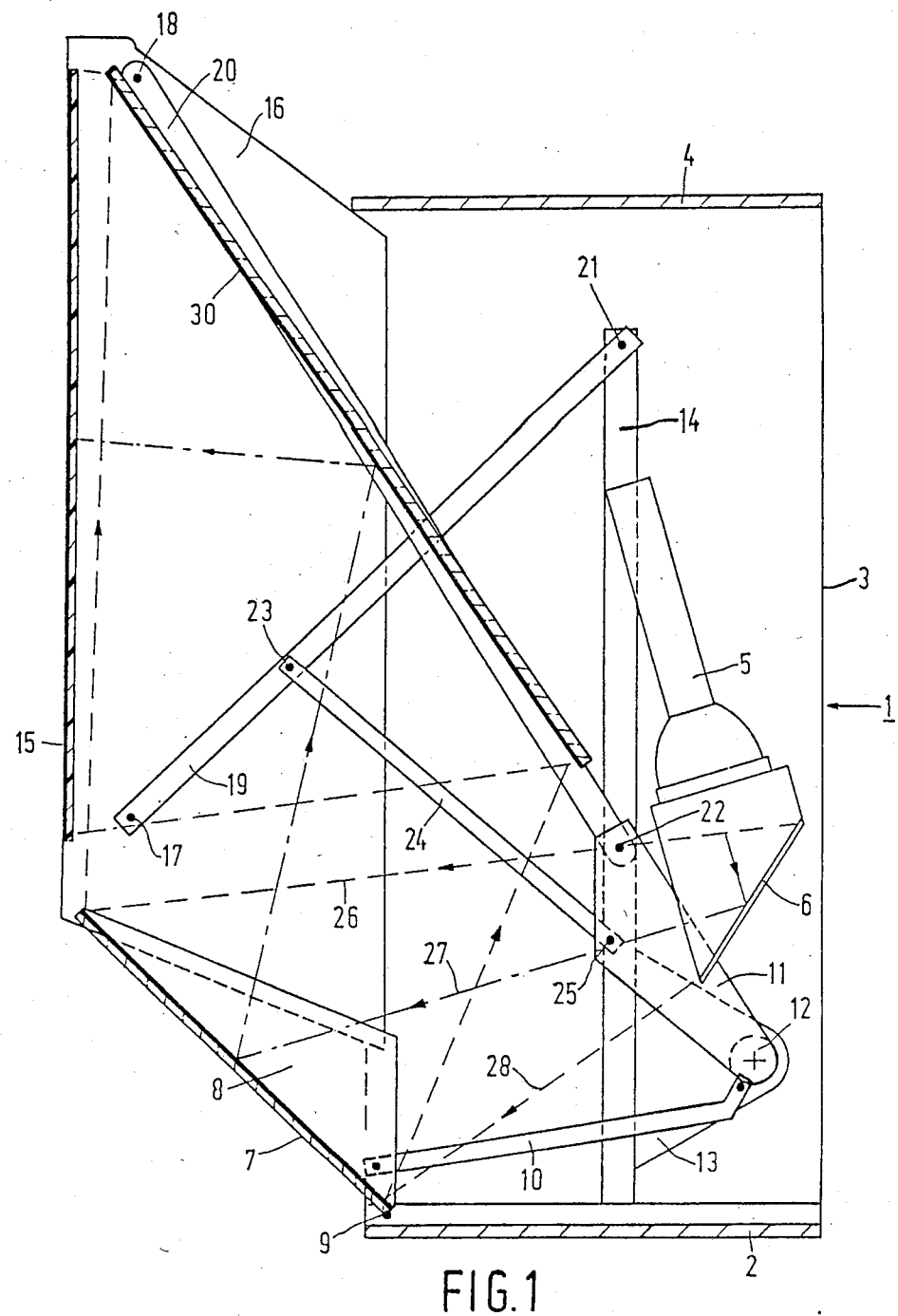

In the drawing, housing 1 includes a bottom 2, a rear wall 3, an upper wall 4 and two side walls. In the housing 1, a cathode-ray tube unit 5 is connected by means (not shown) to a frame 14. The tube unit is provided with a lens 6 which projects the rays onto a first mirror 7. This mirror 7 extends over a part of the width of the housing 1, the width of the housing extending in a direction perpendicular to the plane of the drawing. The mirror 7 is provided at two opposite sides with side plates 8 and with pivots 9 by means of which the mirror 7 is pivotally connected to the bottom 2 of the housing 1. The side plates 8 are each pivotally linked by a bar 10 to one of two plates 11. The plates 11 are fixedly secured on the ends of a shaft 12 which is pivotable about a second axis perpendicular to the symmetry plane, and is journalled in lugs 13, which are secured to the frame 14 adjacent the side walls of the housing. The shaft 12 is coupled to a controllable electric motor not shown.

The apparatus is further provided with a transparent screen 15 which extends throughout the width of the housing and substantially parallel to the front side of the housing. The transparent screen 15 is provided at two opposite sides with side plates 16. Each of these side plates 16 carries two pivots 17, 18 which are connected via bars 19, 20 which cross one another to pivots 21, 22, respectively, on the frame 14 and an associated one of the plates 11, respectively. The pivots 21 thus define a third axis fixed with respect to the frame and perpendicular to the symmetry plane. The pivots 22 define a movable fourth axis, parallel to the other defined axes, which is thus spaced from the second axis about which the plates 11 pivot, while the bars 19 and 20 serve as first and second rigid links supporting and positioning the screen 15. Each bar 19 is further provided between its ends with a pivot 23 which is connected by a third link or bar 24 to a pivot 25 on the associated plate 11. The pivots 35 thus define a fifth parallel axis, also spaced a given distance from the second axis. Further, the pivots 17 and 18 define sixth and seventh parallel axes, spaced from the third and fourth axes respectively by distances defined by the lengths of the first and second links, which are moved to define the screen 15 position.

A second mirror 30 is supported between the two bars 20. The path of the light rays 26,27,28 from the cathode-ray tube is indicated in FIG. 1 by dotted lines parallel to or symmetrical about a plane of symmetry to which each of the pivot axes is perpendicular.

Figure 2:
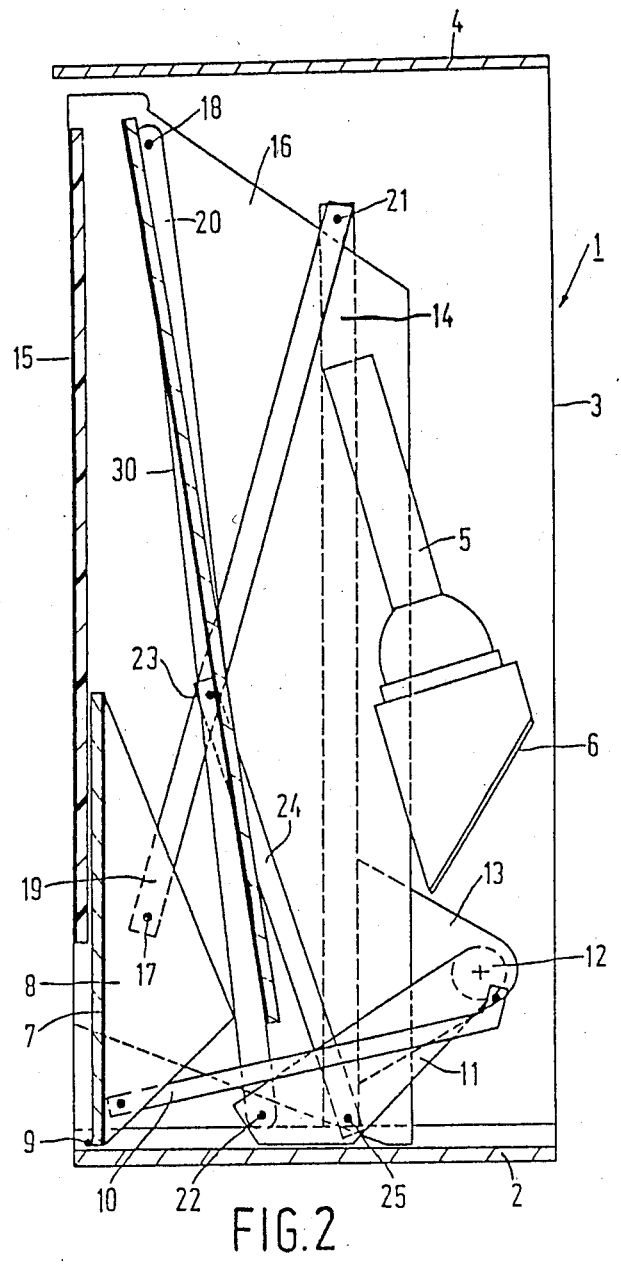
FIG. 2 is a similar view of the apparatus in the folded condition.

By actuation of the electric motor (not shown), the shaft 12 can be rotated through a given angle, whereby in position 1 the situation shown in FIG. 2 is reached. In this position, the mirrors and the transparent screen are folded so that they are in a stowed position located entirely within the confines of the housing 1.

In the other position, the situation shown in FIG. 1 is obtained. In this case, the mirror 7, like the transparent screen 15 and the second mirror, is extended. The transparent screen has not only moved forwards but has also moved slightly upwards, which has the advantage that a better eye level for the spectator is obtained.

In a practical embodiment, the dimension of the apparatus from front to back was 67 cm in the extended condition and only 42 cm in the folded condition. This ensures that the apparatus, when it is out of use, occupies only a very small space so that it can be used conveniently in smaller rooms.

What is claimed is:

1. A video rear-screen projection apparatus, comprising:
   a housing accommodating a fixedly arranged cathode-ray tube unit which is provided with a projection lens and which is secured to a frame which, adjacent two opposite side walls of the housing, has two members in which a shaft coupled to a motor is journalled at its ends, which shaft carries a respective plate at each of its ends;
   a first mirror which extends in the direction of width of the housing and which is connected, at two opposite sides via pivots arranged approximately in alignment with a front side of the housing, to the side walls of the housing, the first mirror being pivotally linked by a bar at each of the two opposite sides to an associated one of the plates so that, in one position of the plates, the first mirror is located entirely inside the housing and, in another position of the plates, the first mirror is extended with its reflecting surface facing the projection lens;
   a transparent screen which extends in the direction of width of the housing and parallel to the front side of the housing and which is provided at each of two opposite sides with a pair of pivots which are located a certain distance above one another and which are connected by first and second bars which cross one another to a pivot on the frame and a pivot on an associated one of the plates, respectively, each of the first bars being provided between its ends with a pivot which is connected via a third bar to the associated one of the plates; and
   a second mirror supported between the second bars in such a manner that, upon rotation of the plates, the screen and the first and the second mirrors are extended so that light rays from the cathode-ray tube strike the transparent screen, while, in a folded condition of the apparatus, the screen and the first and the second mirrors are located inside the housing.

2. An apparatus as claimed in claim 1, wherein the apparatus in the folded condition has a front to back dimension of 42 cm.

3. An apparatus as claimed in claim 1, wherein the housing has an upper wall lying in a plane oriented substantially perpendicularly to the side walls, and wherein the screen when extended is located partly above the plane.

4. An apparatus as claimed in claim 3, wherein the apparatus when the screen and the first and the second mirrors are extended has a front to back dimension of 67 cm.

5. A screen extension linkage for an image projector, comprising a frame defining first, second and third pivot axes which are mutually parallel and perpendicular to a plane of symmetry,
a mirror connected to said frame for pivotal movement about said first axis, said mirror being substantially perpendicular to said plane,
a crank member connected to said frame for pivotal movement about said second axis between folded and projection positions, and comprising means for defining fourth and fifth pivot axes, perpendicular to said plane of symmetry, spaced from each other and from said second axis, and fixed in relative relationship to each other and to said second axis,
a first rigid link connected to said frame for pivotal movement about said third axis, and comprising means for defining a sixth pivot axis perpendicular to said plane and spaced from said third axis,
a second rigid link connected to said crank member for pivotal movement about said fourth axis, and comprising means for defining a seventh pivot axis perpendicular to said plane and spaced from said fourth axis,
a screen connected to said first link for pivotal movement about said sixth axis and connected, at a location spaced from the sixth axis, to said second link for pivotal movement about said seventh axis,
a third rigid link connected to said crank member for pivotal movement about said fifth axis and pivotally connected, at a location spaced from the fifth axis, to said first link at a location between said third and sixth axes,
means for pivoting said mirror from an inside position to an extended projection position responsive to pivoting of said crank member from the folded position to the projection position, and
means for projecting an image reflected by said mirror onto said screen when the crank member is in the projection position,
said axes being arranged relative to each other such that in the crank projection position said screen is extended to a projection position, and in the crank folded position said screen is in a stowed inside position generally parallel to said screen projection position.

6. A projector as claimed in claim 5, wherein said screen projection position is a generally vertical position, and is higher than said stowed inside position.

7. A projector as claimed in claim 6, wherein in the inside position said screen overlaps and is outside of said mirror.

8. A projector as claimed in claim 7, comprising a housing within which said frame is mounted, said first pivot axis being adjacent a bottom surface of the housing and, in the stowed inside position, said screen, mirror, links and crank member being entirely disposed within the housing.

9. A projector as claimed in claim 8, wherein the projector comprises two said second links, and a second mirror supported between and fixed to said second links perpendicular to said plane of symmetry, and
   said means for projecting includes at least one projection element for directing light rays toward said first mirror, said rays being reflected from the first mirror to the second mirror and then to the screen when the crank member is in the projection position.

10. A projector as claimed in claim 9, wherein said at least one projection element includes a projection lens fixed to said frame.

11. A projector as claimed in claim 10, wherein said means for projecting further includes a cathode ray tube fixed to said frame.

12. A projector as claimed in claim 7, wherein the projector comprises two said second links, and a second mirror supported between and fixed to said second links perpendicular to said plane of symmetry, and said means for projecting includes at least one projection element for directing light rays toward said first mirror, said rays being reflected from the first mirror to the second mirror and then to the screen when the crank member is in the projection position.

13. A projector as claimed in claim 6, wherein the projector comprises two said second links, and a second mirror supported between and fixed to said second links perpendicular to said plane of symmetry, and said means for projecting includes at least one projection element for directing light rays toward said first mirror, said rays being reflected from the first mirror to the second mirror and then to the screen when the crank member is in the projection position.

14. A projector as claimed in claim 5, wherein the projector comprises two said second links, and a second mirror supported between and fixed to said second links perpendicular to said plane of symmetry, and said means for projecting includes at least one projection element for directing light rays toward said first mirror, said rays being reflected from the first mirror to the second mirror and then to the screen when the crank member is in the projection position.

* * * * *